(12) United States Patent
Soh et al.

(10) Patent No.: US 11,366,494 B2
(45) Date of Patent: Jun. 21, 2022

(54) DISPLAY MODULE AND FOLDABLE DISPLAY DEVICE INCLUDING THE SAME

(71) Applicant: Samsung Display Co., LTD., Yongin-si (KR)

(72) Inventors: Yong Kwon Soh, Hwaseong-si (KR); In Soo Park, Hwaseong-si (KR); Jin Yong Sim, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 57 days.

(21) Appl. No.: 17/083,229

(22) Filed: Oct. 28, 2020

(65) Prior Publication Data
US 2021/0216106 A1    Jul. 15, 2021

(30) Foreign Application Priority Data
Jan. 14, 2020 (KR) .......................... 10-2020-0004689

(51) Int. Cl.
*H04M 1/02* (2006.01)
*G09F 9/30* (2006.01)
*G06F 1/16* (2006.01)

(52) U.S. Cl.
CPC .......... *G06F 1/1652* (2013.01); *G06F 1/1681* (2013.01); *G09F 9/301* (2013.01); *H04M 1/0268* (2013.01)

(58) Field of Classification Search
CPC combination set(s) only.
See application file for complete search history.

(56) References Cited

U.S. PATENT DOCUMENTS

| | | | |
|---|---|---|---|
| 2021/0096600 A1* | 4/2021 | Soh | G06F 1/1652 |
| 2021/0141124 A1* | 5/2021 | Park | G09F 9/301 |
| 2021/0210715 A1* | 7/2021 | Soh | H01L 51/5237 |

* cited by examiner

*Primary Examiner* — Lisa Lea-Edmonds
(74) *Attorney, Agent, or Firm* — H.C. Park & Associates, PLC

(57) ABSTRACT

A display module provides a panel part, a first supporting member, a second supporting member, a receiving guide member and a shielding member. The panel part includes a pixel array to display an image. The first supporting member is disposed under the panel part. The second supporting member is disposed under the panel part and adjacent to the first supporting member along a first direction. The receiving guide member is combined with the second supporting member. The shielding member covers a boundary area between the first supporting member and the second supporting member, and is combined with the first supporting member, and is allowed to slide on the second supporting member and is partially disposed in a receiving space between the receiving guide member and the second supporting member, and is flexible to be bendable or foldable in response to deformation of the panel part.

20 Claims, 15 Drawing Sheets

FIG. 6
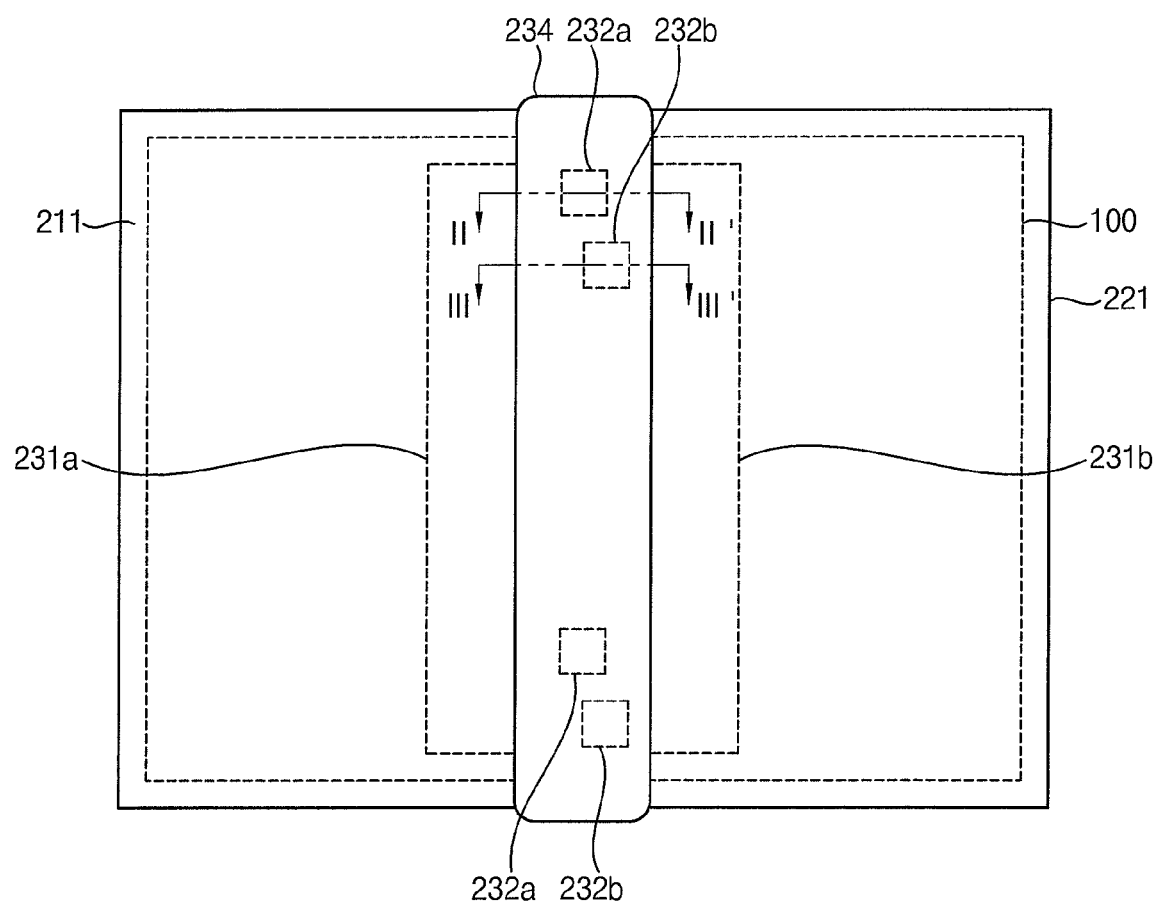

DISPLAY MODULE AND FOLDABLE DISPLAY DEVICE INCLUDING THE SAME

CROSS-REFERENCE TO RELATED APPLICATION

This application claims priority from and the benefit of Korean Patent Application No. 10-2020-0004689 filed on Jan. 14, 2020, which is hereby incorporated by reference for all purposes as if fully set forth herein.

BACKGROUND

Field

Exemplary embodiments/implementations of the invention relate generally to a display device. More particularly, embodiments relate to a display module and a foldable display device including a hinge structure.

Discussion of the Background

A display device provides information to users by displaying an image. Recently, a flexible display device, which may be transformed to have various shapes, is being developed.

A flexible display device may be folded, bended or rolled like a paper. A flexible display device may be easily carried and may increase convenience for users.

The above information disclosed in this Background section is only for understanding of the background of the inventive concepts, and, therefore, it may contain information that does not constitute prior art.

SUMMARY

Embodiments provide a display module having an impurity-blocking structure.

Embodiments provide a foldable display device with improved reliability.

Additional features of the inventive concepts will be set forth in the description which follows, and in part will be apparent from the description, or may be learned by practice of the inventive concepts.

Exemplary embodiments provide a display module including a panel part, a first supporting member, a second supporting member, a receiving guide member and a shielding member. The panel part includes a pixel array to display an image. The first supporting member is disposed under the panel part. The second supporting member is disposed under the panel part and adjacent to the first supporting member along a first direction. The receiving guide member is combined with the second supporting member. The shielding member covers a boundary area between the first supporting member and the second supporting member, and is combined with the first supporting member, and is allowed to slide on the second supporting member and is partially disposed in a receiving space between the receiving guide member and the second supporting member, and is flexible to be bendable or foldable in response to deformation of the panel part.

In an embodiment, the shielding member is combined with a lower surface of the first supporting member.

In an embodiment, the shielding member includes at least one of a polymeric film and a metallic film.

In an embodiment, the polymeric film includes at least one of polycarbonate, polyethylene terephthalate, polyamide, polymethylmethacryalate, polyethylene, polypropylene and polyurethane.

In an embodiment, the metallic film includes stainless steel.

In an embodiment, the receiving guide member is combined with the second supporting member by an adhesive member.

In an embodiment, the receiving guide member has a rectangular shape having a first side overlapping the shielding member and extending along a second direction perpendicular to the first direction. The adhesive member is disposed along a second side connected to the first side, a third side opposite to the second side and connected to the first side and a fourth side opposite to the first side and connected to the second and third sides.

In an embodiment, the receiving guide member has a rectangular shape having a first side overlapping the shielding member and extending along a second direction perpendicular to the first direction. The adhesive member is disposed along a second side connected to the first side and a third side opposite to the second side and connected to the first side.

In an embodiment, the panel part includes a flexible base substrate including a polymeric material.

In an embodiment, the display module further includes an impact-absorbing member disposed between the panel part and the first supporting member and between the panel part and the second supporting member.

Exemplary embodiments also provide a foldable display device including a panel part, a first supporting member, a second supporting member, a shielding member and a hinge part. The panel part includes a pixel array to display an image. The first supporting member is disposed under the panel part. The second supporting member is disposed under the panel part and adjacent to the first supporting member along a first direction. The shielding member covers a boundary area between the first supporting member and the second supporting member, and is combined with the first supporting member, and is allowed to slide on the second supporting member. The hinge part is disposed under the shielding member.

According to embodiments, a structure including a shielding member is provided to block impurities entering a display module. The shielding member has flexibility to be deformable in response to deformation of the display module and is allowed to slide or to be displaced on a supporting member. Thus, a shielding structure may be maintained when the display module is folded or bended, and reliability for repeated deformation may be structurally improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Aspects of one or more embodiments of the present inventive concept will be more clearly understood from the following detailed description taken in conjunction with the accompanying drawings.

FIG. 6 is a bottom view illustrating a foldable display device according to an embodiment.

DETAILED DESCRIPTION

Figure 1:
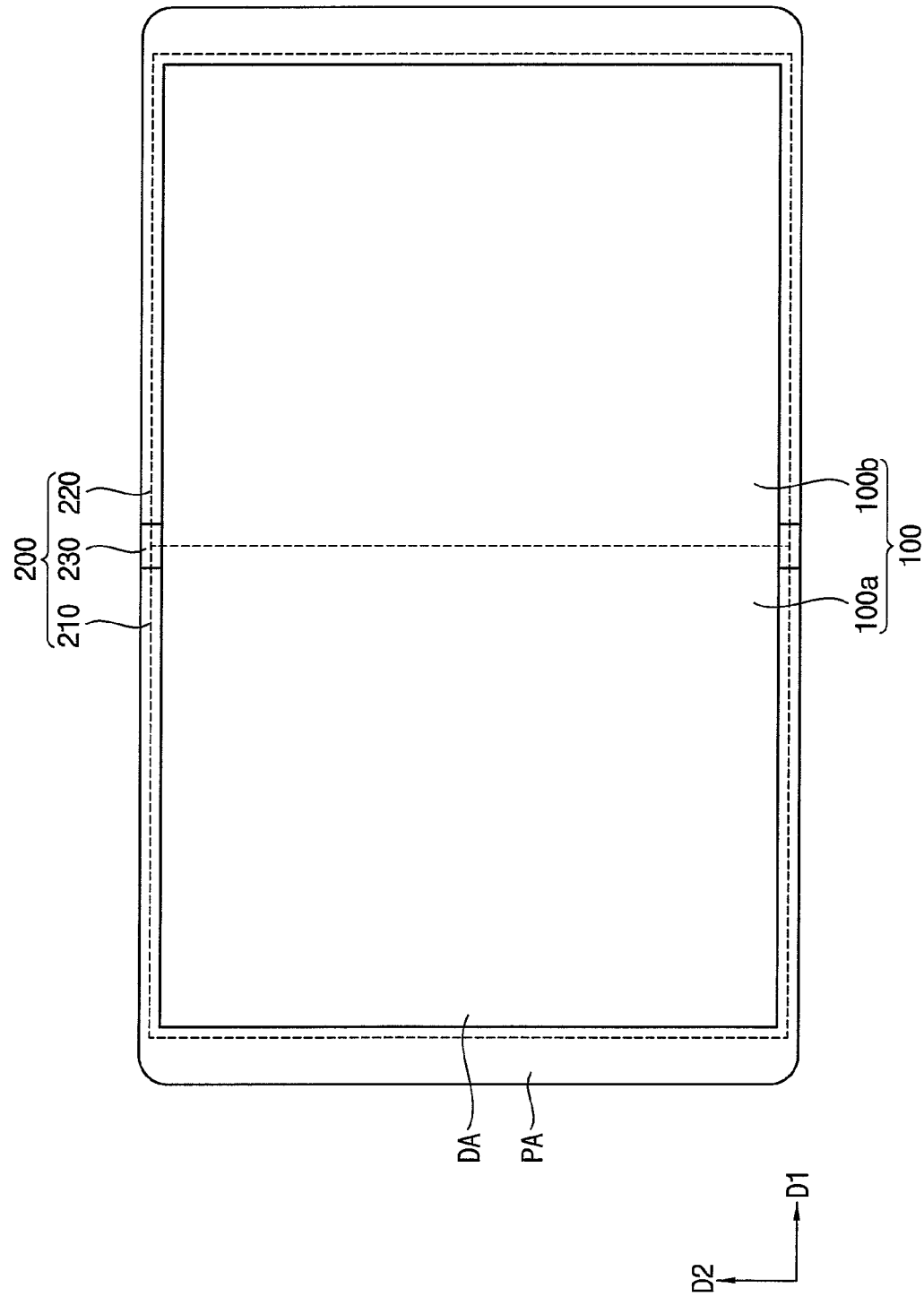
FIG. 1 is a plan view illustrating a foldable display device according to an embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

A display device according to embodiments of the present inventive concept will be described hereinafter with reference to the accompanying drawings, in which some embodiments are illustrated.

Figure 2:
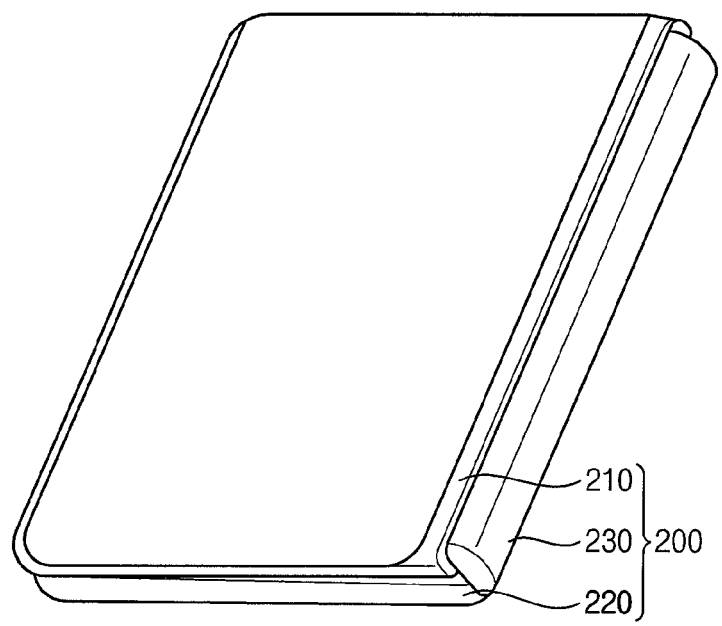
FIG. 2 is a perspective view illustrating a foldable display device according to an embodiment.

FIG. 1 is a plan view illustrating a foldable display device according to an embodiment. FIG. 2 is a perspective view illustrating a foldable display device according to an embodiment. FIG. 1 may illustrate a foldable display device, which is unfolded, and FIG. 2 may illustrate a foldable display device, which is folded.

A foldable display device according to an embodiment includes a display module 100 and a cover module 200. In the foldable display device an area that displays an image may be defined as a display area DA. An area that does not display an image and is adjacent to the display area DA may be defined as a peripheral area PA.

The display module 100 includes a screen to display an image. The display module 100 includes a pixel array configured to emit a light through the screen. For example, the pixel array may generate a light or may adjust a transmittance of a light provided from an external light source to display an image.

In an embodiment, the display module 100 may include a flexible display panel that may be bended or folded by, for example, by an external force. The display module 100 may include an organic light-emitting display panel for example.

The cover module 200 is combined with the display module 100. The cover module 200 may receive the display module 100. The cover module 200 may cover at least a lower surface of the display module 100. For example, the cover module 200 may include a first cover portion 210 that is combined with a first region 100a of the display module. The cover module 200 may also include a second cover portion 220 that is combined with a second region 200a of the display module 100. The cover module 200 may further cover a side surface and/or a portion of an upper surface of the display module 100.

The first cover portion 210 may be adjacent to the second cover portion 220 along a first direction D1. The first cover portion 210 and the second cover portion 220 are combined with a hinge part 230. The first cover portion 210 and the second cover portion 220 are rotatable around the hinge part 230. The first cover portion 210 and the second cover portion 220 are capable of rotating around a rotation axis of the hinge part 230. Thus, the display device may be bended or folded. The hinge part 230 and the rotation axis may extend along a second direction D2 crossing the first direction D1.

Figure 3:
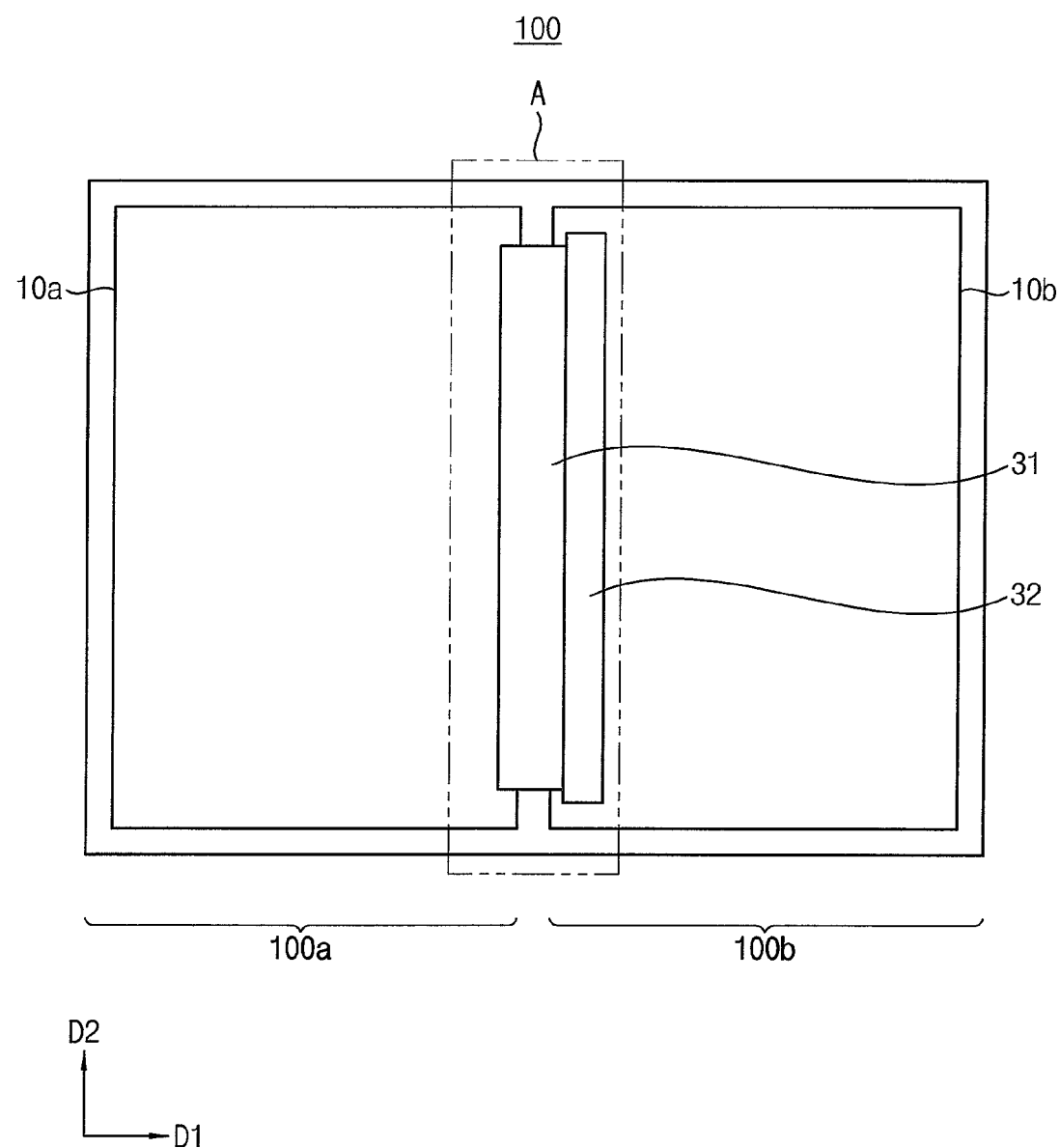
FIG. 3 is a bottom view illustrating a display module according to an embodiment.
Figure 4:
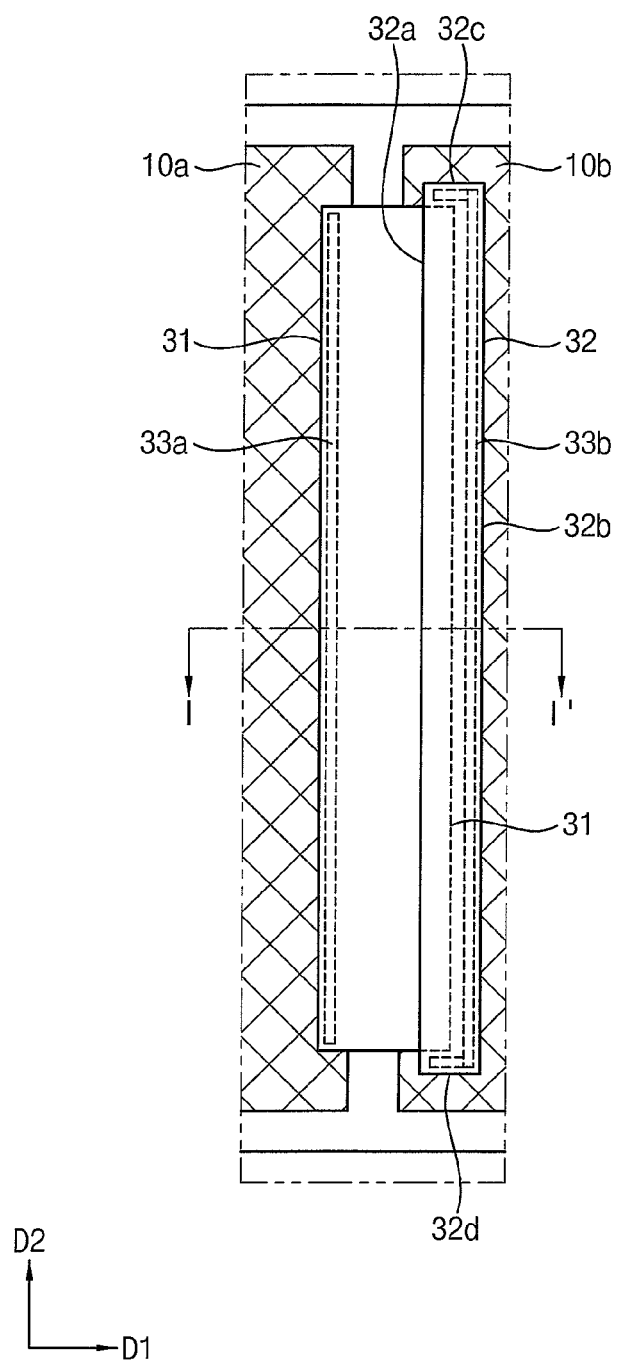
FIG. 4 is an enlarged bottom view illustrating the region 'A' of FIG. 3.
Figure 5:
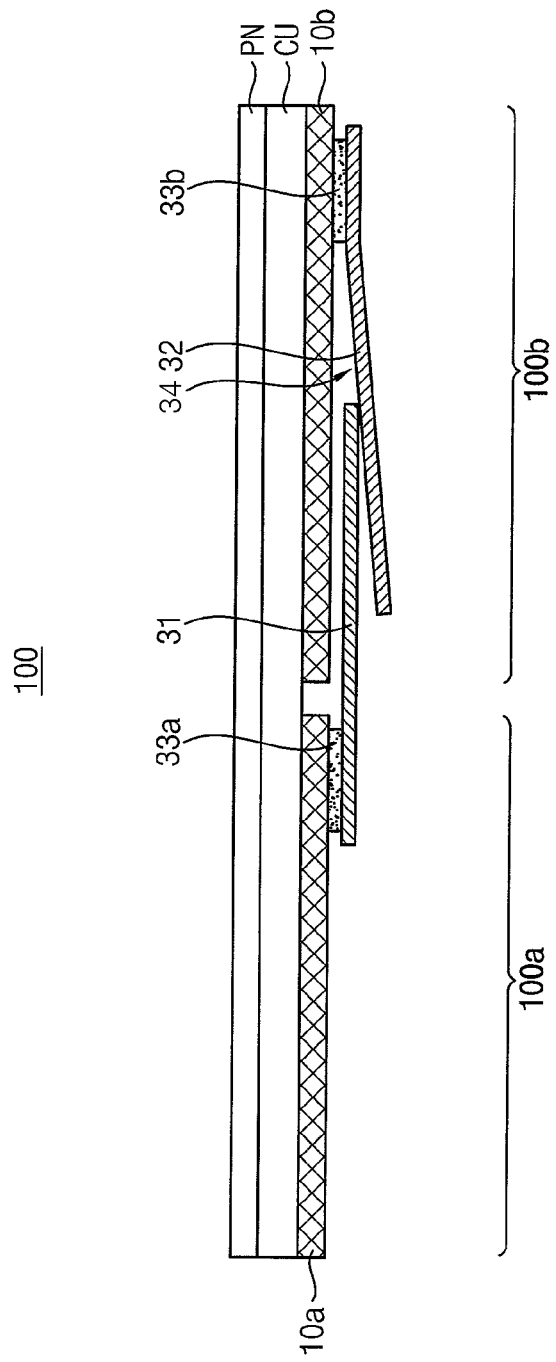
FIG. 5 is a cross-sectional view taken along the line I-I' of FIG. 4.

FIG. 3 is a bottom view illustrating a display module according to an embodiment. FIG. 4 is an enlarged bottom view illustrating the region 'A' of FIG. 3. FIG. 5 is a cross-sectional view taken along the line I-I' of FIG. 4.

Referring to FIGS. 3 to 5, a display module 100 may include a panel part PN. In an embodiment, the panel part PN may include an organic light-emitting display panel.

A supporting member may be disposed under the panel part PN. For example, the display module 100 may include a first supporting member 10a disposed in the first region 100a and a second supporting member 10b disposed in the second region 100b.

The first supporting member 10a may be adjacent to the second supporting member 10b along the first direction D1. For example, the first supporting member 10a may be spaced apart from the second supporting member 10b. However, embodiments are not limited thereto. For example, when the display module 100 is unfolded, the first supporting member 10a and the second supporting member 10b may be adjacent to and substantially contact each other.

The first and second supporting members 10a and 10b may include a rigid material to support the panel part PN. For example, the first and second supporting members 10a and 10b may include a metal, a polymeric material or a combination thereof.

The display module 100 may further include an impact-absorbing member CU. For example, the impact-absorbing member CU may be disposed between the panel part PN and the supporting members 10a and 10b.

For example, the impact-absorbing member CU may have a porous structure. The impact-absorbing member CU having a porous structure may absorb an impact applied to the display module 100 from an exterior to protect the panel part PN. Furthermore, the impact-absorbing member CU may block impurities entering the panel part PN.

For example, the impact-absorbing member CU may include a foam body formed from a polymeric material. For example, the impact-absorbing member CU may include a foam body formed from acrylonitrile butadiene styrene copolymer (ABS), polyurethane (PU), polyethylene (PE), ethylene vinyl acetate (EVA), polyvinyl chloride (PVC) or a combination thereof.

In another embodiment, the impact-absorbing member CU may be omitted or may be partially disposed between the panel part PN and the supporting members 10a and 10b.

In an embodiment, the display module 100 includes a shielding member 31 and a receiving guide member 32. The shielding member 31 may cover a boundary area between the first region 100a and the second region 100b to block impurities entering the display module 100 from an area under the shielding member 31. The receiving guide member 32 covers a portion of the shielding member 31.

In an embodiment, the shielding member 31 may be disposed on a lower surface of the first and second supporting members 10a and 10b, and may be combined with the first supporting member 10a. For example, the shielding member 31 may include a first portion overlapping the first supporting member 10a and a second portion overlapping the second supporting member 10b. A smaller portion of the shielding member 31 overlaps the first supporting member 10a than a larger portion of the shielding member 31 that overlaps the second supporting member 10b. The first smaller portion of the shielding member 31 may be combined with the first supporting member 10a. The larger portion of the shielding member 31 may be disposed between the second supporting member 10b and the receiving guide member 32.

The receiving guide member 32 may be combined with the second supporting member 10b. A portion of the receiving guide member 32 may be spaced apart from the second supporting member 10b thereby defining a receiving space 34, which receives a portion of the shielding member 31, between the second supporting member 10b and the receiving guide member 32.

The shielding member 31 may be combined with a lower surface of the first supporting member 10a by using a first adhesive member 33a. The receiving guide member 32 may be combined with a lower surface of the second supporting member 10b by using a second adhesive member 33b.

The second adhesive member 33b may be disposed along at least a side of the receiving guide member 32. In an embodiment, the second adhesive member 33b may be disposed along three sides of the receiving guide member 32 except for a side that overlaps the shielding member 31. For example, when the receiving guide member 32 has a rectangular shape, and when a side of the receiving guide member 32 overlapping the shielding member 31 is referred to as a first side 32a, the second adhesive member 33b may be disposed along a second side 32b connected to the first side, a third side 32c connected to the first side and opposite to the second side, and a fourth side 32d connected to the second and third sides and opposite to the first side.

The above structure may block impurities penetrating into the display module 100 through the receiving space 34 between the shielding member 31 and the second supporting member 10b, and may prevent the second larger portion of the shielding member 31 from leaving the receiving space 34 when the display module 100 is folded.

In an embodiment, the shielding member 31 is not combined with the second supporting member 10b or the receiving guide member 32 using an adhesive. Thus, when the display module 100 is transformed or deformed, displacement between the shielding member 31 and the receiving guide member 32 or between the shielding member 31 and the second supporting member 10b may occur. For example, the second larger portion of the shielding member 31 may function as a free end and may slide on the second supporting member 10b and the receiving guide member 32 when the display module 100 is folded or bent.

The shielding member 31 may preferably have flexibility to be bendable or foldable in response to deformation of the display module 100. Also, the shielding member 31 may preferably have a modulus equal to or more than a predetermined value so that the shielding member 31 may slide on the second supporting member 10b and the receiving guide member 32.

For example, the shielding member 31 may include a polymeric film, a metallic film or a combination thereof.

The polymeric film may include polycarbonate, polyethylene terephthalate, polyamide, polymethylmethacryalate, polyethylene, polypropylene, polyurethane or a combination thereof. The metallic film may include stainless steel (SUS) or the like. The shielding member 31 may be coated with a fluorine-containing resin such as polytetrafluoroethylene (PTFE).

Materials for the receiving guide member 32 are not specifically limited. For example, the receiving guide member 32 may include a thermoplastic polymer, a thermosetting polymer, a metal or a combination thereof. The receiving guide member 32 may be combined with the second supporting member 10b by another coupling member or coupling process instead of the adhesive member.

If the shielding member 31 is combined with both of the first supporting member 10a and the second supporting member 10b, the shielding member 31 may not be deformed when the display module 100 is folded or bent. Thus if connected in this way, the shielding member 31 may be damaged by forced strain, or may require an individual stretchable structure. If the shielding member 31 includes a stretchable material, the shielding member 31 may be easily damaged by abrasion because a stretchable material is generally weak at abrasion.

In an embodiment, the shielding member 31 is combined with the first supporting member 10a, and may be guided to slide and prevented from leaving the receiving space 34 by the receiving guide member 32. A length of the receiving guide member 32 is predetermined to withhold a length of the shielding member 31 when the display module 100 is folded or bent. Thus, even when the display module 100 is folded or bent, a shielding structure configured to block impurities may be maintained, and reliability to repeated deformation may be structurally improved.

Figure 7:
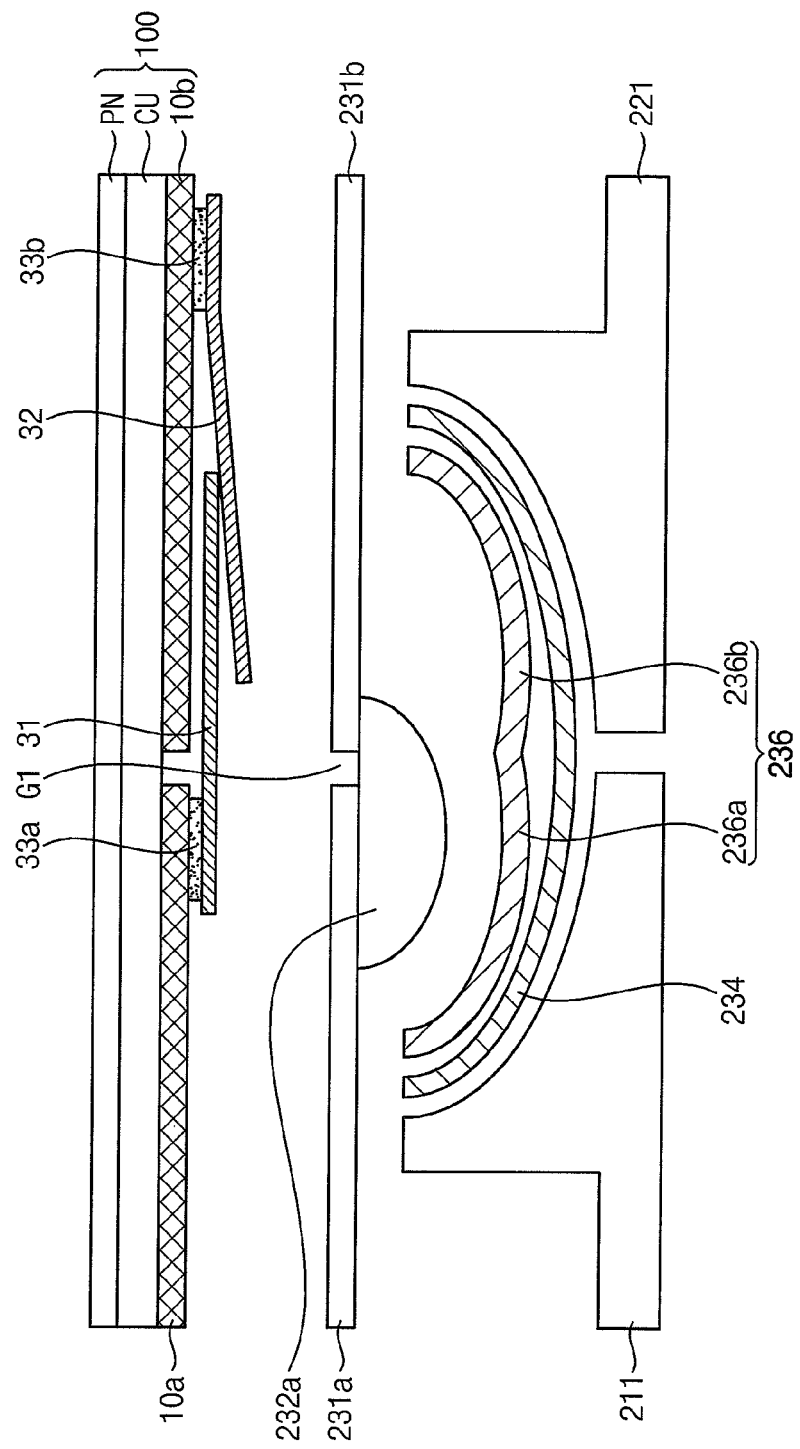
FIGS. 7, 8, 9, 10, 11, and 12 are cross-sectional views illustrating a hinge area of a foldable display device according to embodiments.
Figure 8:
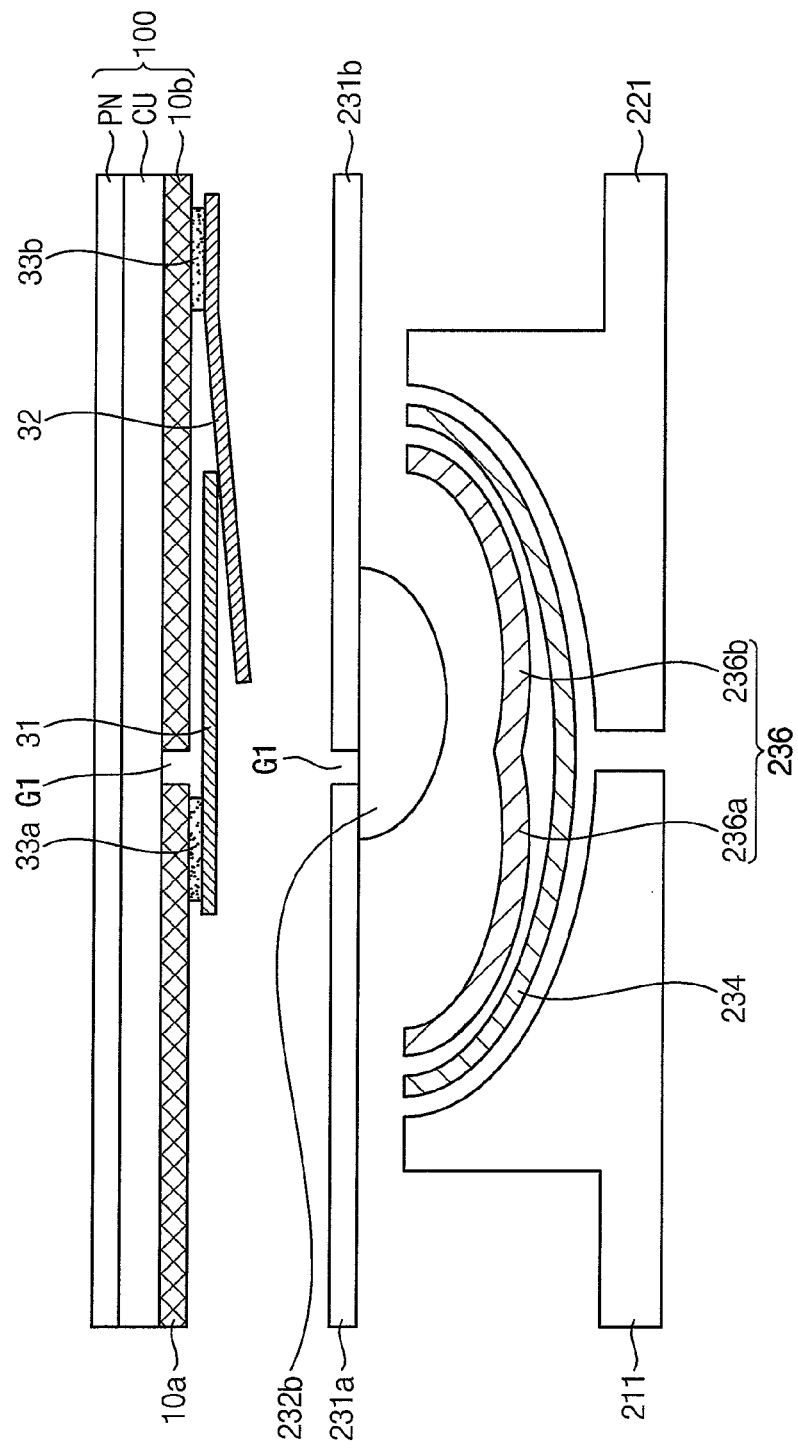
Figure 9:
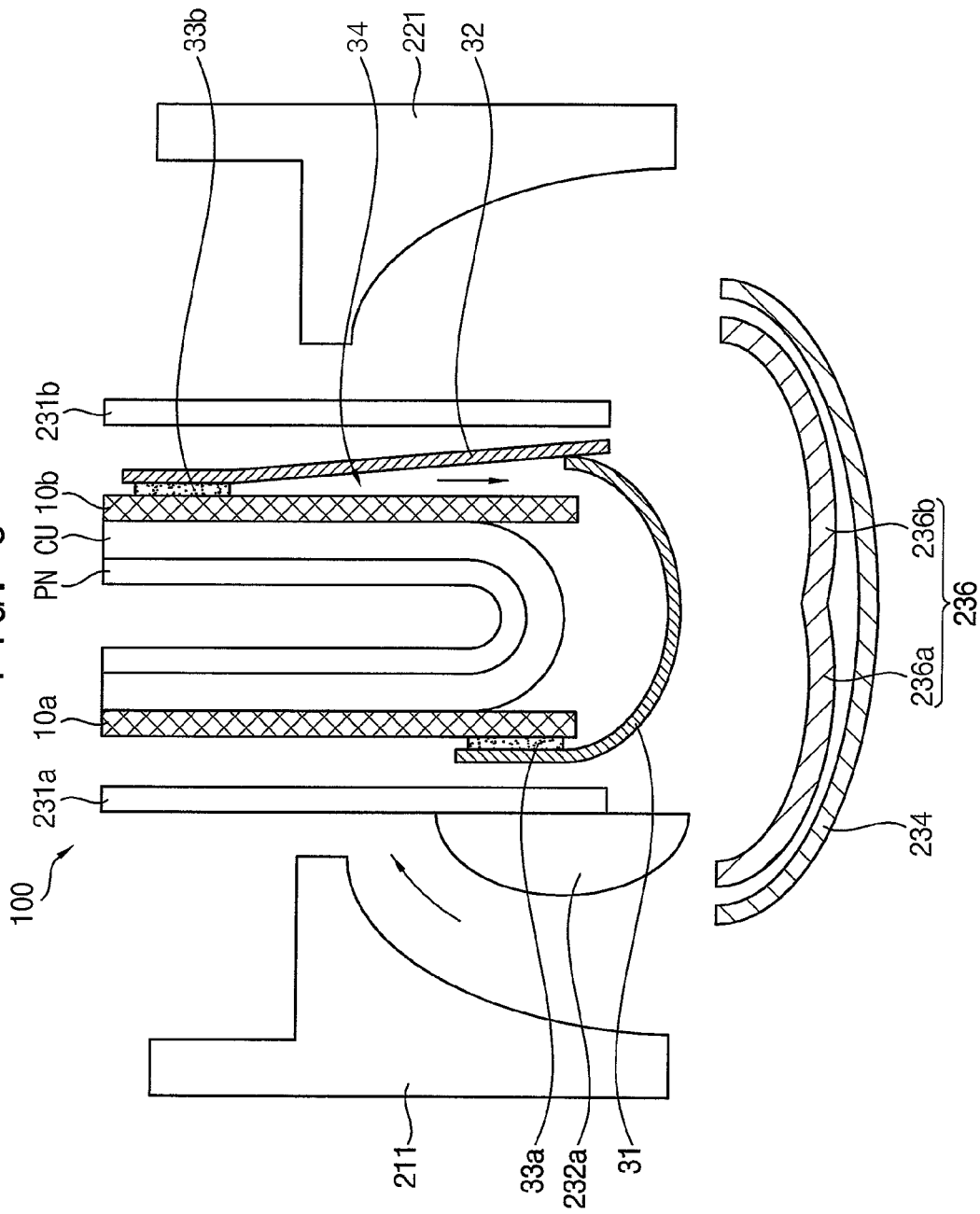
Figure 10:
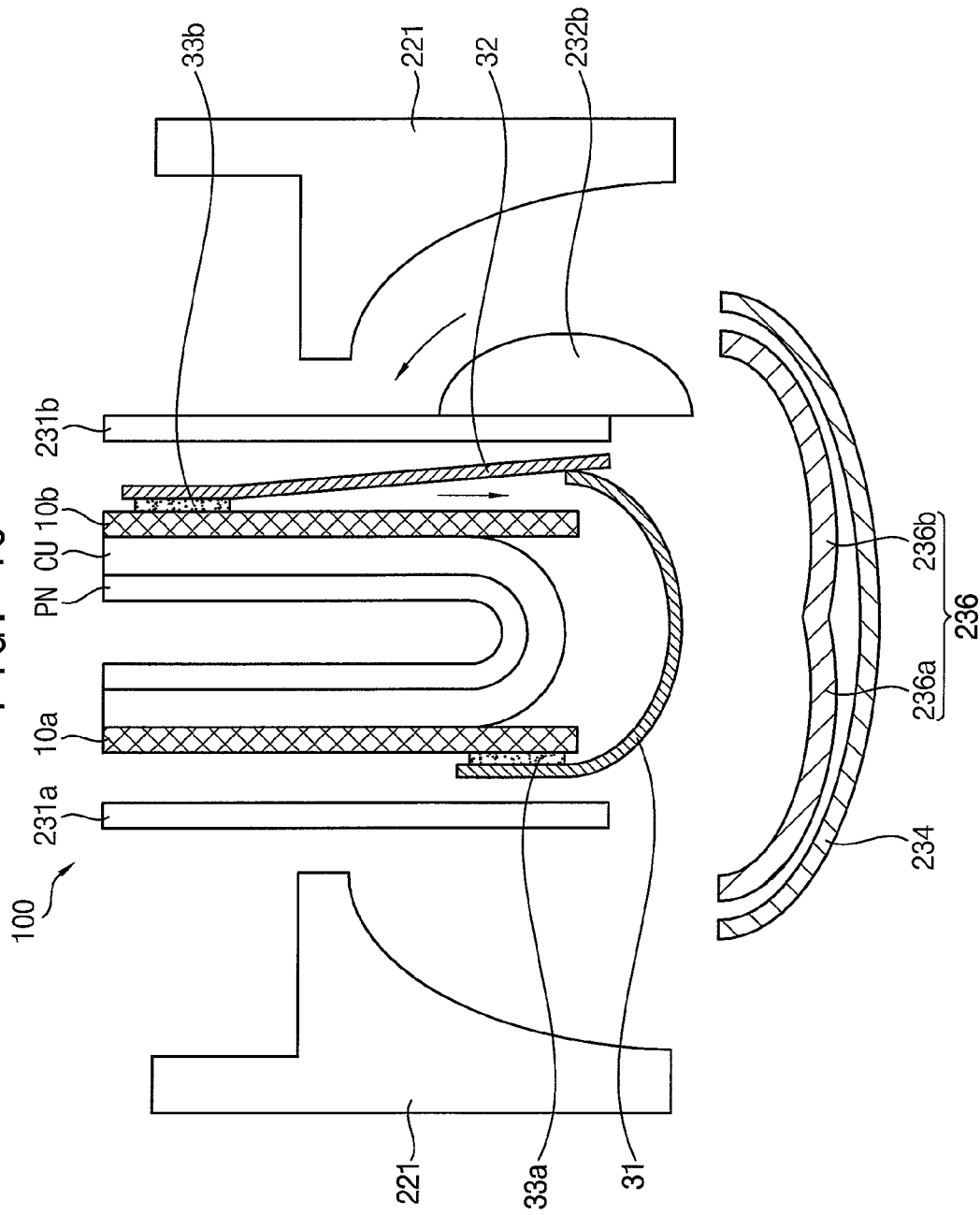

FIG. 6 is a bottom view illustrating a foldable display device according to an embodiment. FIGS. 7 to 12 are cross-sectional views illustrating a hinge area of a foldable display device according to embodiments. FIGS. 7 and 9 illustrate a cross-section taken along the line II-II' of FIG. 6 when the foldable display device is in an unfolded and folded position, respectively. FIGS. 8 and 10 illustrate a cross-section taken along the line of III-III' FIG. 6 when the foldable display device is in an unfolded and folded position, respectively.

Referring to FIGS. 6, 7, and 8, a display device includes a display module 100 and a cover module. FIGS. 6, 7, and 8 illustrate an unfolded display device. The cover module includes a hinge part, a first bottom cover 211 and a second bottom cover 221.

The display module 100 may be substantially same as the display module previously explained with reference to FIGS. 3 to 5. For example, the display module 100 may include a panel part PN, an impact-absorbing member CU, a first supporting member 10a, a second supporting member 10b, a shielding member 31, which covers a boundary area between the first supporting member 10a and the second supporting member 10b and has a first portion combined with the first supporting member 10a, and a receiving guide member 32 that covers a second portion of the shielding member 31.

The hinge part is combined with the display module 100. For example, the hinge part may be disposed on a lower surface of a folding area of the display module 100. Thus, the hinge part may overlap the boundary area between the first supporting member 10a and the second supporting member 10b. The first bottom cover 211 may cover a lower surface of the first supporting member 10a of the display module 100. The second bottom cover 221 may cover a lower surface of the second supporting member 10b of the display module 100.

In an embodiment, the hinge part may include a hinge frame 236, a first rotation-sliding member 232a, a second rotation-sliding member 232b, a first connection member 231a, a second connection member 231b and a hinge cover 234. In an embodiment, the rotation-sliding members 232a and 232b combined with the connection members 231a and 231b may rotate and slide on curved portions of the hinge frame 236. Thus, the connection members 231a and 231b and the supporting members 10a and 10b connected thereto may be allowed to rotate.

The first connection member 231a may be combined with the first supporting member 10a of the display module 100. The second connection member 231b may be combined with the second supporting member 10b of the display module 100. Referring to FIGS. 7 and 8, a space may be defined between the first supporting member 10a and the first connection member 231a. However, embodiments are not limited thereto. For example, the first supporting member 10a and the first connection member 231a may partially or entirely contact each other. For example, the first connection member 231a may be disposed on an exposed lower surface of the first supporting member 10a so that the first connection member 231a may not face a lower surface of the shielding member 31.

When the second connection member 231b is disposed under the larger portion of the shielding member 31 and the receiving guide member 32, a space may be defined between the second connection member 231b and the second supporting member 10b to allow sliding of the shielding member 31 upon folding. For example, the second connection member 231b may be combined with an exposed lower surface of the second supporting member 10b and may be designed to form a space between the second supporting member 10b and the second connection member 231b that is configured to receive the receiving guide member 32 and the shielding member 31 through a suitable process.

The first connection member 231a and the second connection member 231b may rotate in different directions. When the display device is in an unfolded position as illustrated in FIGS. 7 and 8, the first connection member 231a may be spaced apart by a gap G1 from the second connection member 231b along the first direction D1. However, embodiments are not limited thereto. For example, when the display device is unfolded, the first connection member 231a may substantially contact the second connection member 231b. The gap G1 may also be representative of the space between the first supporting member 10a and second supporting member 10b.

The first and second connection members 231a and 231b may function as a bracket of the hinge part. For example, the first and second connection members 231a and 231b may be a metallic plate, respectively. However, embodiments are not limited thereto. For example, the first and second connection members 231a and 231b may include a polymeric material or the like.

In an embodiment, the hinge frame 236 may include a first guide portion 236a and a second guide portion 236b. The first and second guide portions 236a and 236b may have curved guiding surfaces, which are configured to guide rotation of the first and second rotation-sliding members 232a and 232b, respectively. The guiding surfaces may have an arc shape with a curvature. The hinge frame 236 may have a shape extending along the second direction D2.

In an embodiment, the first and second guide portions 236a and 236b may be connected to each other so that the hinge frame 236 may have a cross-section of a dual-arc shape. However, embodiments are not limited thereto. For example, the first and second guide portions 236a and 236b may be separated from each other, or the hinge frame 236 may have a cross-section of a single arc shape.

The first rotation-sliding member 232a may be combined with the first connection member 231a, and may slide along the guiding surface of the first guide portion 236a. Thus, the first rotation-sliding member 232a and the first connection member 231a may rotate around a first rotation axis. In an embodiment, the first rotation-sliding member 232a may overlap a boundary area between the first connection member 231a and the second connection member 231b. Thus, the first rotation-sliding member 232a may overlap a portion of the second connection member 231b. In an unfolded configuration, a larger portion of the first rotation-sliding member 232a may be in contact with the first connection member 231a than the second connection member 231b. This may provide stability and debris protection when in an unfolded state.

The second rotation-sliding member 232b may be combined with the second connection member 231b, and may slide along the guiding surface of the second guide portion 236b. Thus, the second rotation-sliding member 232b and the second connection member 231b may rotate around a second rotation axis. In an embodiment, the second rotation-sliding member 232b may overlap the boundary area between the first connection member 231a and the second connection member 231b. Thus, the second rotation-sliding member 232b may overlap a portion of the first connection member 231a. In an unfolded configuration, a larger portion of the second rotation-sliding member 232b may be in contact with the second connection member 231b than the first connection member 231a. This may provide additional stability and debris protection when in an unfolded state.

Referring to FIG. 6, the number of the rotation-sliding members 232a and 232b may be four. However, embodiments are not limited thereto, and a display device according to embodiments may have more than four rotation-sliding members as desired.

The hinge cover 234 may cover the hinge frame 236. For example, the hinge cover 234 may have a shape extending along the second direction D2. For example, the hinge cover 234 may have a cross-section having an arc shape.

The first and second bottom covers 211 and 221 may respectively rotate around the hinge part. For example, the first and second bottom covers 211 and 221 may rotate along an outer cylindrical surface of the hinge cover 234 around a rotation axis.

Even though not illustrated, the hinge part may further include a cam structure that is configured to synchronize movement of the rotation-sliding members 232a and 232b, a hinge housing configured to fix the hinge frame 236, or the like.

FIGS. 9 and 10 illustrate a folded display device. Referring to FIG. 9, the first rotation-sliding member 232a includes a sliding and rotating surface having an arc shape. When the display device is unfolded, the sliding and rotating surface of the first rotation-sliding member 232a faces the guiding surface of the first guide portion 236a of the hinge frame 236. When a force is applied to the display device to fold the display device, the first rotation-sliding member 232a becomes disengaged from the second connection member 231b and may slide along the guiding surface of the first guide portion 236a to rotate around the first rotation axis. Thus, the first rotation-sliding member 232a, the first connection member 231a combined with the first rotation-sliding member 232a and the first bottom cover 211 disposed under the first connection member 231a may rotate around the first rotation axis.

Referring to FIG. 10, when a force is applied to the display device to fold the display device, the second rotation-sliding member 232b may become disengaged from the first connection member 231a and slide along the guiding surface of the second guide portion 236b to s rotate around the second axis. Thus, the second rotation-sliding member 232b, the second connection member 231b combined with the second rotation-sliding member 232b and the second bottom cover 221 disposed under the second connection member 231b may rotate around the second rotation axis.

In an embodiment, the display module 100 may be combined with the first connection member 231a and the second connection member 231b. Thus, the display module 100 may be folded or unfolded depending on operation of the hinge part.

When the display module 100 is folded or bent, a distance between the supporting member 10a and the second supporting member 10b is increased. The supporting member 10a and 10b move from a position across the gap G1 in relation to each other in the D1 direction, to rotating about the hinge part and being positioned a larger distance apart in the D1 direction. In an embodiment, the shielding member 31 is not fixed to the second supporting member 10b. Thus, the shielding member 31 may slide on or along the second supporting member 10b. Furthermore, the second larger portion of the shielding member 31, which is adjacent to the second supporting member 10b, is covered by the receiving guide member 32 so that the second larger portion of the shielding member 31 may be guided and remain disposed between the second supporting member 10b and the receiving guide member 32. Thus, when the shielding member 31 is bent, the shielding member 31 may be prevented from leaving the receiving space 34 between the second supporting member 10b and the receiving guide member 32. Thus, when the display module 100 is folded, the shielding member 31 may also have a bent shape or a folded shape. Because of a rigid material used for the shielding member 31, the shielding member 31 be bent in an arc shape.

In an embodiment, the second connection member 231b of the hinge part may function as a receiving guide member so that a display module may not include an individual receiving guide member.

Figure 11:
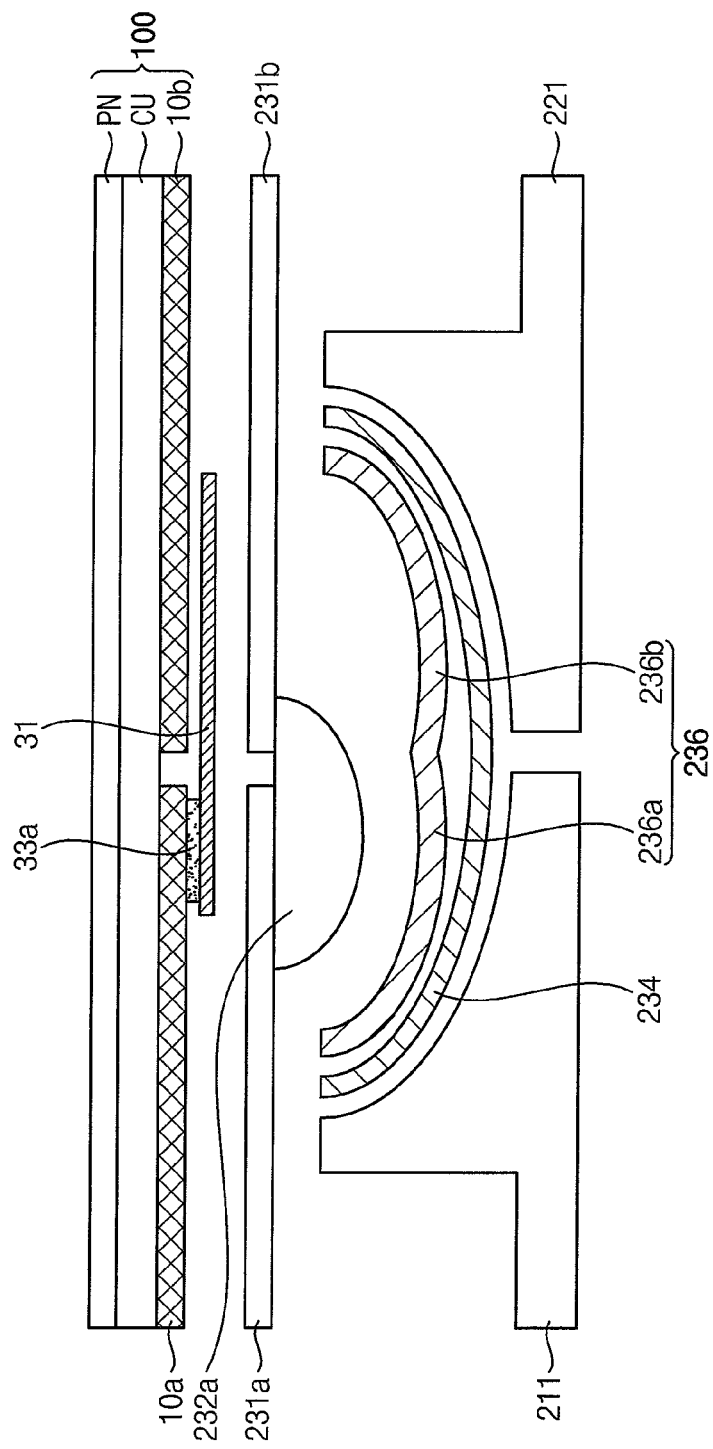

For example, as illustrated in FIG. 11, a display module 100 may include a panel part PN, an impact-absorbing member CU, a first supporting member 10a, a second supporting member 10b, and a shielding member 31, which covers a boundary area between the first supporting member 10a and the second supporting member 10b and has a first smaller portion combined with the first supporting member 10a. A second larger portion of the shielding member 31 may be disposed on a lower surface of the second supporting member 10b, and may not be combined with the second supporting member 10b.

A display device includes a hinge part combined with the display module 100. For example, the hinge part may be disposed on a lower surface of a folding area of the display module 100.

In an embodiment, the hinge part may include a hinge frame 236, a first rotation-sliding member 232a, a second rotation-sliding member 232b, a first connection member 231a, a second connection member 231b and a hinge cover 234. The first connection member 231a may be combined with the first supporting member 10a of the display module 100. The second connection member 231b may be combined with the second supporting member 10b of the display module 100. A space may be defined between the second supporting member 10b and the second connection member 231b. Thus, the second portion of the shielding member 31 may be received in the space between the second supporting member 10b and the second connection member 231b.

Figure 12:
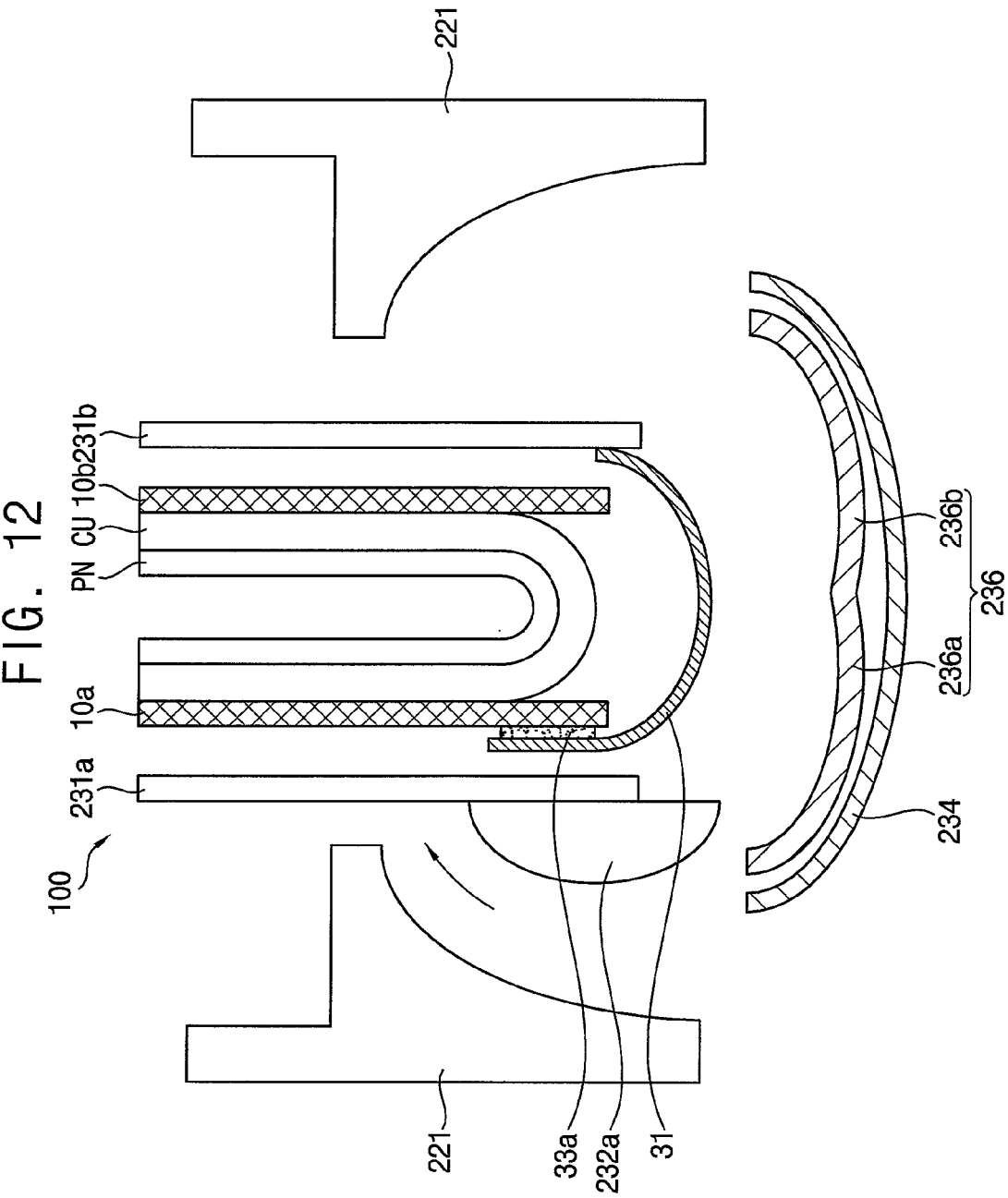

As illustrated in FIG. 12, when the display module 100 is folded, the shielding member 31 may be guided by the second connection member 231b to slide between the second supporting member 10b and the second connection member 231b, and may be prevented from leaving the space between the second supporting member 10b and the second connection member 231b.

Therefore, the larger portion of the shielding member 31 may be configured with a predetermined length to remain connected to the receiving guide member 32 in some embodiments, or to the second connection member 231b. A length of the receiving guide member 32 and second connection member 231b may also be designed having a length such that the shielding member 31 when bent or folded does not extend beyond the receiving guide member 32 or second connection member 231b.

Figure 13:
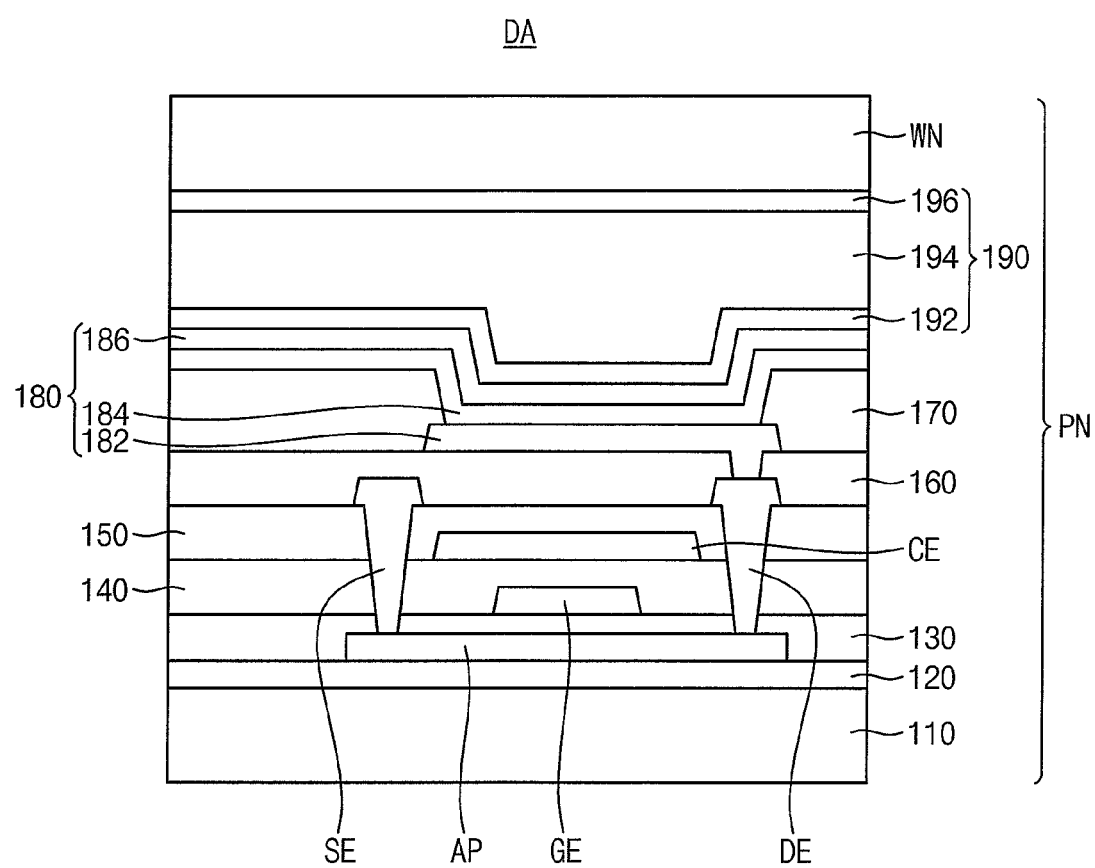
FIG. 13 is a cross-sectional view illustrating a panel part of a foldable display device according to an embodiment.

FIG. 13 is a cross-sectional view illustrating a panel part of a foldable display device according to an embodiment.

Referring to FIG. 13, a pixel unit of a panel part PN may include a driving element disposed on a base substrate 110 and a light-emitting element electrically connected to the driving element. In an embodiment, the light-emitting element may be an organic light-emitting diode. The driving element may include at least one thin film transistor.

A buffer layer 120 may be disposed on the base substrate 110. An active pattern AP may be disposed on the buffer layer 120.

For example, the base substrate 110 may include glass, quartz, sapphire, a polymeric material or the like. In an embodiment, the base substrate 110 may be a flexible substrate including a polymeric material. For example, the base substrate 110 may include polyethylenenaphthelate, polyethyleneterephehalate, polyetherketone, polycarbonate, polyarylate, polyethersulphone, polyimide or a combination thereof.

The panel part PN may further includes a supporting substrate disposed under the base substrate 110.

The buffer layer 120 may prevent or reduce permeation of impurities, humidity or external gas from underneath of the base substrate 110, and may reduce a roughness of an upper surface of the base substrate 110. For example, the buffer layer 120 may include an inorganic material such as oxide, nitride or the like.

A first gate metal pattern including a gate electrode GE may be disposed on the active pattern AP. A first insulation layer 130 may be disposed between the active pattern AP and the gate electrode GE.

A second gate metal pattern including a capacitor electrode pattern CE may be disposed on the gate electrode GE. The capacitor electrode pattern CE may include a capacitor electrode to form a capacitor, a wiring configured to transfer various signals or the like.

A second insulation layer 140 may be disposed between the gate electrode GE and the capacitor electrode pattern CE. A third insulation layer 150 may be disposed on the capacitor electrode pattern CE.

For example, the active pattern AP may include silicon or a metal oxide semiconductor. In an embodiment, the active pattern AP may include polycrystalline silicon (polysilicon), which may be doped with n-type impurities or p-type impurities.

In another embodiment or in another transistor that is not illustrated, an active pattern may include a metal oxide semiconductor. For example, the active pattern may include two-component compound ($AB_x$), ternary compound ($AB_xC_y$) or four-component compound ($AB_xC_yD_z$), which contains indium (In), zinc (Zn), gallium (Ga), tin (Sn), titanium (Ti), aluminum (Al), hafnium (Hf), zirconium (Zr), magnesium (Mg). For example, the active pattern may include zinc oxide ($ZnO_x$), gallium oxide ($GaO_x$), titanium oxide (TiO$_x$), tin oxide (SnO$_x$), indium oxide (InO$_x$), indium-gallium oxide (IGO), indium-zinc oxide (IZO), indium tin oxide (ITO), gallium zinc oxide (GZO), zinc magnesium oxide (ZMO), zinc tin oxide (ZTO), zinc zirconium oxide (ZnZr$_x$O$_y$), indium-gallium-zinc oxide (IGZO), indium-zinc-tin oxide (IZTO), indium-gallium-hafnium oxide (IGHO), tin-aluminum-zinc oxide (TAZO), indium-gallium-tin oxide (IGTO) or the like.

The first insulation layer 130, the second insulation layer 140 and the third insulation layer 150 may include silicon oxide, silicon nitride, silicon carbide or a combination thereof. Furthermore, the first insulation layer 130, the second insulation layer 140 and the third insulation layer 150 may include an insulating metal oxide such as aluminum oxide, tantalum oxide, hafnium oxide, zirconium oxide, titanium oxide or the like. For example, the first insulation layer 130, the second insulation layer 140 and the third insulation layer 150 may have a single-layered structure or a multi-layered structure including silicon nitride and/or silicon oxide, respectively, or may have different structures from each other.

The gate electrode GE and the capacitor electrode pattern CE may include a metal, a metal alloy, a metal nitride, a conductive metal oxide or the like. For example, the gate electrode GE and the capacitor electrode pattern CE may include gold (Au), silver (Ag), aluminum (Al), copper (Cu), nickel (Ni), platinum (Pt), magnesium (Mg), chromium (Cr), tungsten (W), molybdenum (Mo), titanium (Ti), tantalum (Ta) or an alloy thereof, and may have a single-layered structure or a multi-layered structure including different metal layers.

A first source metal pattern may be disposed on the third insulation layer 150. The first source metal pattern may include a source electrode SE and a drain electrode DE, which electrically contact the active pattern AP. The source electrode SE and the drain electrode DE may pass through the insulation layers disposed thereunder to contact the active pattern AP, respectively.

The first source metal pattern may include a metal, a metal alloy, a metal nitride, a conductive metal oxide or the like. For example, the first source metal pattern may include gold (Au), silver (Ag), aluminum (Al), copper (Cu), nickel (Ni), platinum (Pt), magnesium (Mg), chromium (Cr), tungsten (W), molybdenum (Mo), titanium (Ti), tantalum (Ta) or an alloy thereof, and may have a single-layered structure or a multi-layered structure including different metal layers. In an embodiment, the first source metal pattern may have a multi-layered structure including an aluminum layer.

A fourth insulation layer 160 may be disposed on the first source metal pattern. The fourth insulation layer 160 may include an organic material. For example, the fourth insulation layer 160 may include an organic insulation material such as a phenol resin, an acryl resin, a polyimide resin, a polyamide resin, a silioxane resin, an epoxy resin or the like.

An organic light-emitting diode 180 may be disposed on the fourth insulation layer 160. The organic light-emitting diode 180 may include a first electrode 182 electrically contacting the drain electrode DE, an organic light-emitting layer 184 disposed on the first electrode 182 and a second electrode 186 disposed on the organic light-emitting layer 184. The organic light-emitting layer 184 of the organic light-emitting diode 180 may be disposed at least in an opening of a pixel-defining layer 170 disposed on the fourth insulation layer 160. The first electrode 182 may be a lower electrode of the organic light-emitting diode 180, and the second electrode 186 may be an upper electrode of the organic light-emitting diode 180.

The first electrode 182 may function as an anode. For example, the first electrode 182 may be formed as a transmitting electrode or a reflecting electrode according to an emission type of the display device. When the first electrode 182 is a transmitting electrode, the first electrode 182 may include indium tin oxide, indium zinc oxide, zinc tin oxide, indium oxide, zinc oxide, tin oxide or the like. When the first electrode 182 is a reflecting electrode, the first electrode 182 may include gold (Au), silver (Ag), aluminum (Al), copper (Cu), nickel (Ni), platinum (Pt), magnesium (Mg), chromium (Cr), tungsten (W), molybdenum (Mo), titanium (Ti) or a combination thereof, and may have a stacked structure further including the material that may be used for the transmitting electrode.

The pixel-defining layer 170 has the opening overlapping at least a portion of the first electrode 182. For example, the pixel-defining layer 170 may include an organic insulating material.

The organic light-emitting layer 184 may include at least a light-emitting layer, and may further include at least one of a hole injection layer (HIL), a hole transporting layer (HTL), an electron transporting layer (ETL) and an electron injection layer (EIL). For example, the organic light-emitting layer 184 may include a low molecular weight organic compound or a high molecular weight organic compound.

In an embodiment, the organic light-emitting layer 184 may emit a red light, a green light or a blue light. In another embodiment, the organic light-emitting layer 184 may emit a white light. The organic light-emitting layer 184 emitting a white light may have a multi-layer structure including a red-emitting layer, a green-emitting layer and a blue-emitting layer, or a single-layer structure including a mixture of a red-emitting material, a green-emitting material and a blue-emitting material.

The second electrode 186 may be formed as a transmitting electrode or a reflecting electrode according to an emission type of the display device. For example, the second electrode 186 may include a metal, a metal alloy, a metal nitride, a metal fluoride, a conductive metal oxide or a combination thereof.

For example, the second electrode 186 and at least one layer of the organic light-emitting layer 184 may be formed as a common layer extending continuously over a plurality of pixels in a display area.

An encapsulation layer 190 may be disposed on the organic light-emitting diode 180. The encapsulation layer 190 may have a stacked structure of an inorganic thin film and an organic thin film. For example, the encapsulation layer 190 may include a first inorganic thin film 192, an organic thin film 194 disposed on the first inorganic thin film 192 and a second inorganic thin film 196 disposed on the organic thin film 194.

A protective window WN may be disposed on the encapsulation layer 190. For example, the protective window WN may include a polymeric material or a glass thin film to have a flexibility.

As desired, at least one of a touch-sensing structure and a polarizing layer may be disposed between the encapsulation layer 190 and the protective window WN.

A supporting substrate may be disposed under the base substrate 110. The supporting substrate may have an opening to reduce a bending stress in a bending area.

Figure 14:
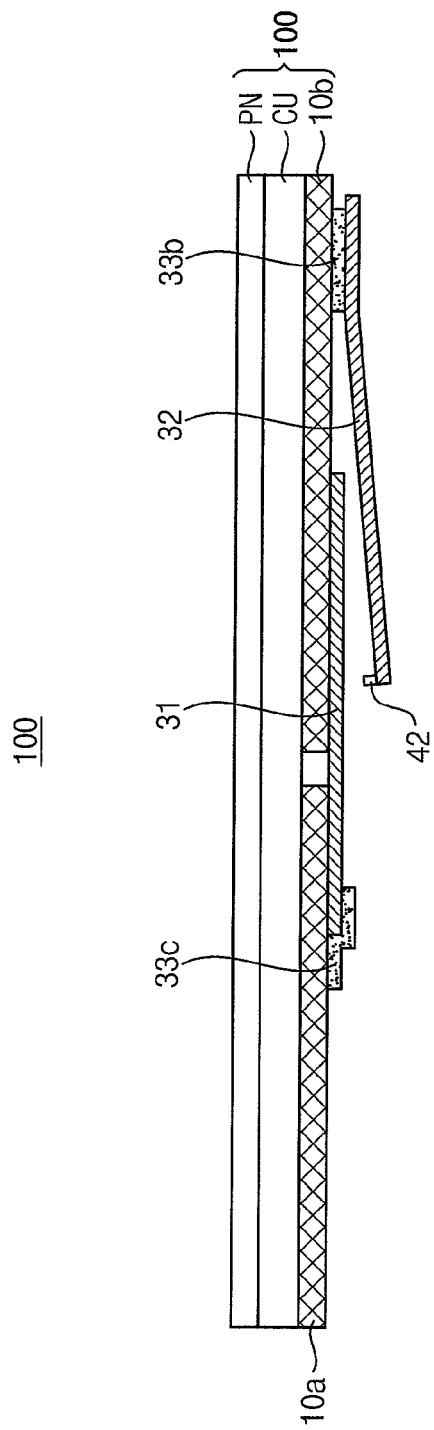
FIG. 14 is a cross-sectional view illustrating a display module according to an embodiment.
Figure 15:
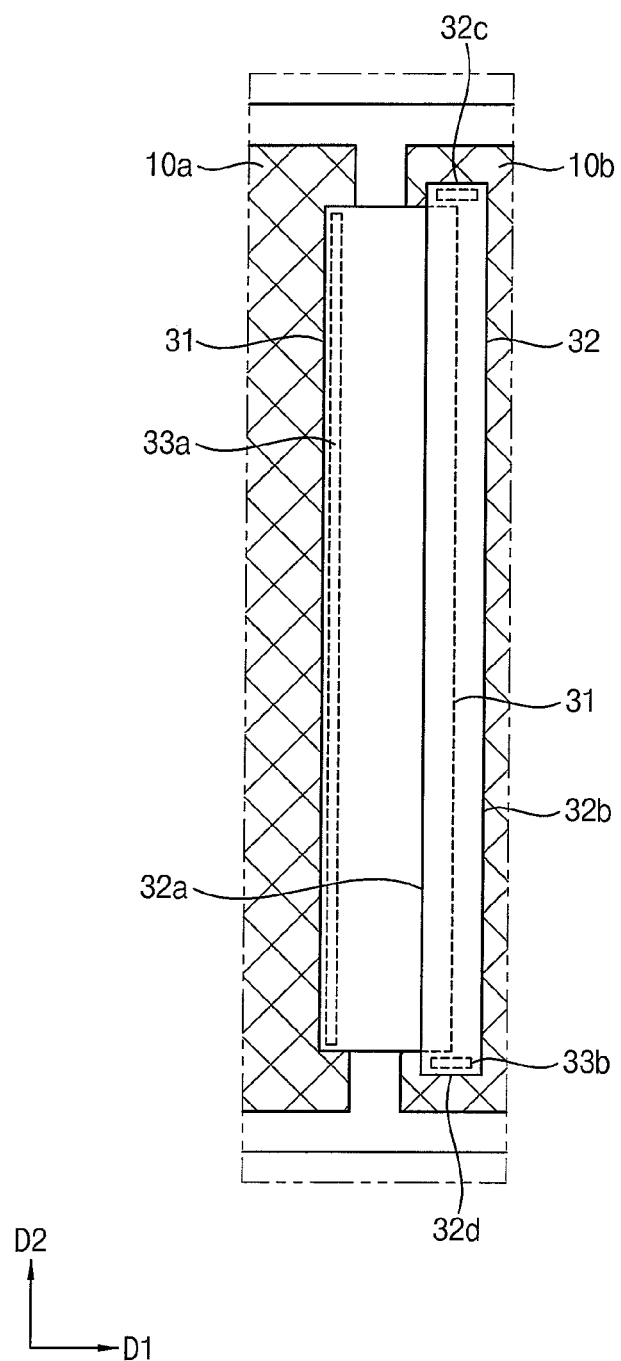
FIG. 15 is a bottom view illustrating a display module according to an embodiment.

FIG. 14 is a cross-sectional view illustrating a display module according to an embodiment. FIG. 15 is a bottom view illustrating a display module according to an embodiment.

Referring to FIG. 14, a display module 100 may include a panel part PN, an impact-absorbing member CU, a first supporting member 10a, a second supporting member 10b, a shielding member 31, which covers a boundary area between the first supporting member 10a and the second supporting member 10b and has a first portion combined with the first supporting member 10a, and a receiving guide member 32 that covers a second portion of the shielding member 31.

In an embodiment, the shielding member 31 may be combined with the first supporting member 10a by a third adhesive member 33c including an adhesive layer on one surface thereof. For example, the third adhesive member 33c may adhere to a lower surface of the first supporting member 10a and a lower surface of the shielding member 31.

The receiving guide member 32 may be combined with the second supporting member 10b by the second adhesive member 33b. The second adhesive member 33b may include adhesive layers on both surfaces thereof, and may adhere to an upper surface of the receiving guide member 32 and a lower surface of the second supporting member 10b. However, embodiments are not limited thereto. The second adhesive member 33b may include an adhesive layer on one surface thereof as the first adhesive member 33a and may adhere to a lower surface of the receiving guide member 32 and the lower surface of the second supporting member 10b.

As part of embodiments described herein and illustrated in FIG. 14, the receiving guide member 32 may include a protrusion 42 at an edge region of the receiving guide member 32. The protrusion 42 may prevent the shielding member 31 from extending past the receiving guide member 32 when the display module 100 is repeated moved from an unfolded position to a folded position and back again. The protrusion may be made of a singular material with the receiving guide member 32 and may be a separate piece that is adhered thereto. The protrusion 42 may also be used as an end member of the second connection member 231b.

Furthermore, the second adhesive member 33b may have various shapes. For example, as illustrated in FIG. 15, the receiving guide member 32 may have a rectangular shape having a first side overlapping the shielding member 31 and extending along a second direction D2 crossing a first direction D1. The second adhesive member 33b may be disposed along the third side 32c of the receiving guide member 32, which is connected to the first side 32a and the second side 32b, and the fourth side 32d, which is connected to the first side 32a and the second side 32b. The third side 32c and the fourth side 32d may extend along the first direction D1.

The above embodiments provide an organic-light emitting display device. However, embodiments are not limited thereto. For example, embodiments may be applied for a hinge structure of display devices such as a liquid crystal display device, a electroluminescent display device, a micro LED display device or the like.

The hinge structure including the shielding member and other features related thereto may be used to block impurities from being impinged upon the display module when the display module is in an unfolded or folded state. When the display module is folded or bent, the rotation-sliding members slide and rotate about a rotation axis. The shielding member slides along a receiving guide member but does not become disengaged from the receiving guide member. In this way internal components of the display panel may be protected.

Embodiments may be applied to various display devices. In an embodiment, for example, embodiments may be applied to vehicle-display device, a ship-display device, an aircraft-display device, portable communication devices, display devices for display or for information transfer, a medical-display device, etc.

The foregoing is illustrative of embodiments and is not to be construed as limiting thereof. Although embodiments have been described, those skilled in the art will readily appreciate that many modifications are possible in the embodiments without materially departing from the novel teachings and aspects of the present inventive concept. Accordingly, all such modifications are intended to be included within the scope of the present inventive concept. Therefore, it is to be understood that the foregoing is illustrative of various embodiments and is not to be construed as limited to the specific embodiments disclosed, and that modifications to the disclosed embodiments, as well as other embodiments, are intended to be included within the scope of the present inventive concept, as set forth in the following claims and equivalents thereof

What is claimed is:

1. A display module comprising:
   a panel part including a pixel array to display an image;
   a first supporting member disposed under the panel part;
   a second supporting member disposed under the panel part and adjacent to the first supporting member along a first direction;
   a receiving guide member combined with the second supporting member;
   a receiving space disposed between the receiving guide member and the second supporting member; and
   a shielding member that covers a boundary area between the first supporting member and the second supporting member, wherein the shielding member is:
   combined with the first supporting member,
   configured to slide along the second supporting member,
   partially disposed in the receiving space, and
   flexible to be bent or folded in response to deformation of the panel part.

2. The display module of claim 1, wherein the shielding member is combined with a lower surface of the first supporting member.

3. The display module of claim 1, wherein the shielding member includes at least one of a polymeric film and a metallic film.

4. The display module of claim 3, wherein the polymeric film includes at least one of polycarbonate, polyethylene terephthalate, polyamide, polymethylmethacryalate, polyethylene, polypropylene and polyurethane.

5. The display module of claim 3, wherein the metallic film includes stainless steel.

6. The display module of claim 1, wherein the receiving guide member is combined with the second supporting member by an adhesive member.

7. The display module of claim 6, wherein the receiving guide member has a rectangular shape having a first side overlapping the shielding member and extending along a second direction perpendicular to the first direction,
   wherein the adhesive member is disposed along a second side connected to the first side, a third side opposite to the second side and connected to the first side and a fourth side opposite to the first side and connected to the second and third sides.

8. The display module of claim 6, wherein the receiving guide member has a rectangular shape having a first side overlapping the shielding member and extending along a second direction perpendicular to the first direction, wherein the adhesive member is disposed along a second side connected to the first side and a third side opposite to the second side and connected to the first side.

9. The display module of claim 1, wherein the panel part includes a flexible base substrate including a polymeric material.

10. The display module of claim 1, further comprising an impact-absorbing member disposed between the panel part and the first supporting member and between the panel part and the second supporting member.

11. A foldable display device comprising:
   a panel part including a pixel array to display an image;
   a first supporting member disposed under the panel part;
   a second supporting member disposed under the panel part and adjacent to the first supporting member along a first direction;
   a shielding member that covers a boundary area between the first supporting member and the second supporting member, is combined with the first supporting member, and is allowed to slide on the second supporting member; and
   a hinge part disposed under the shielding member.

12. The foldable display device of claim 11, wherein the hinge part includes:
   a first connection member combined with the first supporting member; and
   a second connection member combined with the second supporting member,
   wherein a portion of the shielding member is disposed between the second supporting member and the second connection member.

13. The foldable display device of claim 12, wherein the hinge part further includes:
   a first rotation-sliding member combined with the first connection member and including a sliding surface having an arc shape;
   a second rotation-sliding member combined with the second connection member and including a sliding surface having an arc shape;
   a hinge frame including a guiding surface, which has an arc shape and faces the sliding surfaces of the first and second rotation-sliding members; and
   a hinge cover covering the hinge frame.

14. The foldable display device of claim 11, further comprising a receiving guide member combined with the second supporting member, wherein a portion of the shielding member is disposed between the second supporting member and the receiving guide member.

15. The foldable display device of claim 11, further comprising a receiving guide member combined with the second supporting member by an adhesive member that is disposed along at least a side of the receiving guide member.

16. The foldable display device of claim 11, wherein the shielding member includes at least one of a polymeric film and a metallic film.

17. The foldable display device of claim 16, wherein the polymeric film includes at least one of polycarbonate, polyethylene terephthalate, polyamide, polymethylmethacrylate, polyethylene, polypropylene and polyurethane.

18. The foldable display device of claim 16, wherein the metallic film includes stainless steel.

19. The foldable display device of claim 11, wherein the panel part includes a flexible base substrate including a polymeric material.

20. The foldable display device of claim 11, further comprising an impact-absorbing member disposed between the panel part and the first supporting member and between the panel part and the second supporting member.

* * * * *